Figure 1:
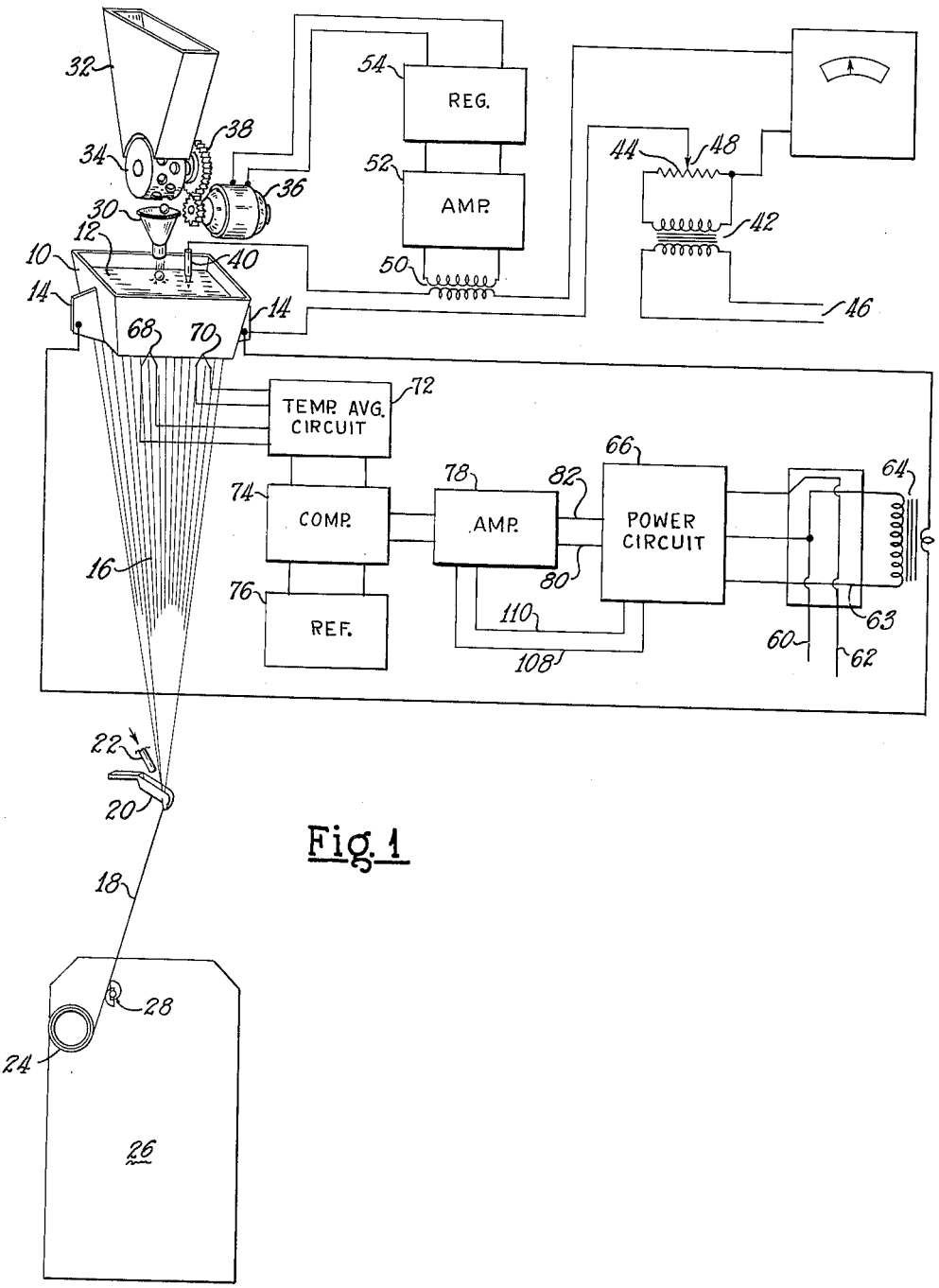

April 12, 1966 W. C. TRETHEWEY 3,246,124
VOLTAGE MAGNITUDE AND TEMPERATURE CONTROL IN A HEATED DEVICE
Filed July 2, 1962 2 Sheets-Sheet 2

INVENTOR.
WILLIAM C. TRETHEWEY
BY
ATTORNEYS

United States Patent Office 3,246,124
Patented Apr. 12, 1966

3,246,124
VOLTAGE MAGNITUDE AND TEMPERATURE
CONTROL IN A HEATED DEVICE
William C. Trethewey, Newark, Ohio, assignor to Owens-
Corning Fiberglas Corporation, a corporation of Delaware
Filed July 2, 1962, Ser. No. 206,604
4 Claims. (Cl. 219—501)

This invention relates generally to a temperature control system and is more particularly directed to a method and means for electrically detecting, measuring and regulating the temperature of the feeder element of a glass melting and feeding furnace.

In its broader aspects the system of the invention embodies a heat generating circuit including a control circuit responsive to phase variations of a control signal; control signal generating circuit, including a temperature responsive device generating a signal varying with temperature and a comparator circuit generating a control signal varying in phase with departure of the signal generated by the temperature responsive device from a predetermined reference signal; and circuit means transmitting said control signal to said control circuit.

In the manufacture of glass fibers for textile strands and yarns, it has been found that the maintenance of very accurate and precise temperature of the molten glass in the feeder element of the apparatus is essential to the production of quality in product produced. The manufacture of continuous glass fibers by mechanical attenuation for textile products involves the withdrawal of molten glass from a platinum alloy container or feeder while the molten material is maintained at a constant temperature. The continuous glass fibers or filaments are produced in the form of a multifiber or filament strand from a large number of orifices in the base of the container or feeder which itself forms an electrical heating element. The container or feeder member may be fed with marbles or small pieces of glass, or alternatively may be supplied directly with molten glass from a premelting unit or a conventional glass melting furnace.

Below the feeder the filaments are coated with a binder and drawn together to form a strand which is wound on a removable sleeve on a high speed winding head. Fibers or filaments of glass produced typically range from 0.0002 in. (5 microns) for the finest textile fiber to 0.0004 in. (10 microns), or more, for fibers used in reinforcing plastics.

The maintenance of the temperature and viscosity of material above the orifices of the feeder plays an important part in determination of the uniformity of diameters of the plurality of fibers produced as well as the end-to-end diameter of each such fiber. In view of the ever increasing demand for such fibers, and their wide range of use for industrial purposes, the tolerance, or tolerable range of variation for general use has been constantly narrowed to present day requirements of less than 1% diameter control for fiber diameters generally in the order of twenty-two one hundred thousandths of an inch. To establish such production on a continuous basis it becomes necessary that the temperature and viscosity controls be exactingly maintained.

In the past, systems have been employed for controlling the temperature of materials in liquid form in the containers or feeders of glass melting assemblies. These systems are supplied with heat and maintained within a desired temperature by direct passage of electrical current through the feeder by way of power connections to terminals opposed disposed thereon. The heating current is alternating current and is supplied to the feeder from the main power supply line through a step-down transformer. Since the feeder is formed of low resistance high temperature metal, such as platinum, the transformer should be capable of providing heating current in the order of one or more kiloamperes. A saturable core reactor is typically contained in the circuit including the primary of the transformer and functions as a variable impedance to permit adjustment of the current flow through the feeder for the temperature desired. Typically, the D.C. winding of the saturable reactor is coupled to a thermocouple through an amplifier and the amplified thermocouple signal in turn controls the alternating current flow through the feeder.

It is a principle of the present invention to provide an economical method and means for controlling the temperature of the materials in liquid form within a container of a glass melting furnace.

It is an object of the invention to provide a system for detecting the temperature of materials in liquid form within a container of a glass melting furnace as represented by the temperature of the container and rapidly correcting any variation in the temperature thereof from a preset value.

It is another object of the invention to provide a temperature detection and control system adjustable for maintaining the temperature of materials of liquid form within an extremely small range which system is light in weight and compact in size.

Figure 2:
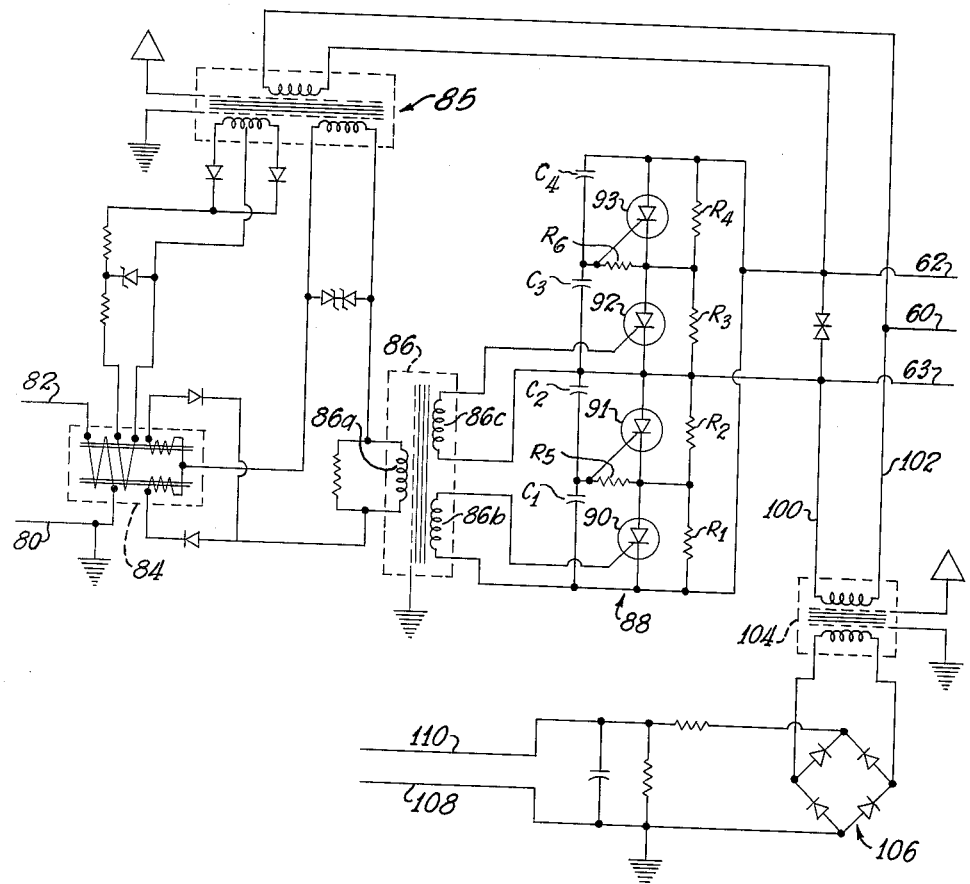

Other objects and features which I believe to be characteristic of my invention are set forth with particularity in the appended claims. My invention itself, however, in both organization and manner of construction, together with further objects and advantages thereof, may be best understood by reference to the following description and the accompanying drawings, to wit:

FIGURE 1 is a schematic and diagrammatic illustration of the arrangement of apparatus for producing glass fibers wherein the temperature of the glass in the bushing or feeder from which the fibers are attenuated is controlled by a novel electrical control system; and FIGURE 2 is a circuit diagram of the power circuit of the invention.

Referring to FIGURE 1, there is illustrated a system employing the concepts of the present invention. More particularly, there is shown a molten glass container or feeder 10 (oftentimes referred to commercially as a "bushing") containing a molten body of glass 12 which is supplied with heat and maintained within a desired temperature range by direct passage of electrical current through the feeder by way of power connections to its oppositely disposed terminals 14. Continuous fibers or filaments of glass 16 are attenuated from orifices in the bottom of the bushing 10 and are gathered together into a strand 18 by passage over a gathering member 20. The fibers are supplied with sizing fluid at the gathering member from a supply tube 22 communicating with a source of such sizing material, not shown. The successively formed portions of the strand 18 are thereupon wound into a package 24 by a winder 26 and the strand is caused to traverse the package by a spiral wire-type traverse mechanism 28.

Solid matter in the form of glass marbles is supplied to the molten body 12 through a funnel or guide tube 30. The marbles are contained in a hopper 32 having an associated rotary feeder 34. The rate of supply of marbles from the hopper to the molten body is established by the rotational speed of a motor 36 which is geared through a speed reducer 38 to the rotary feed mechanism 34.

The level of the molten body 12 is detected or sensed by a probe 40 having a tapered tip in contact with the surface of the molten body and the feeder. A potential difference is established between the probe and body 12, in the feeder 10, by electrical connections to a transformer 42 through a voltage divider 44. The transformer 42 is connected to an electrical energy supply line 46 and transforms the supplied voltage to a relatively low voltage in its secondary for supply to the voltage divider 44. A variable tap 48 of the voltage divider allows the selection of the voltage to be applied across the feeder 10 and the body 12 through a terminal 14 and the probe 40. A coupling transformer 50 in series with the probe 40 transmits a current signal from the circuit loop incorporating the probe to an amplifier 52, which in turn supplies the amplified current signal to a regulator 54. The regulator 54 is connected to the field winding of the motor 36.

When the level of the molten body 12 falls below a predetermined desired height determined by the probe position, the current flow in the probe loop is reduced by reason of the reduced area of interfacial contact of the molten material with the probe tip. The probe current and correspondingly the amplified signal supplied to the regulator 54 is reduced to cause a corresponding increase in the voltage at the rotary drive motor 36 through the regulator 54. The increased voltage results in an increase in speed of the rotary feeder 34 and a corresponding increase in the rate of feed of the material, faster than the rate of withdrawal from the molten body 12.

Should the level of the molten body 12 increase above the predetermined height, the regulator reduces the voltage at the motor 36 as determined by the amplified probe current signal supplied to the regulator so that the rate of feed of solid material (marbles) to the molten body is reduced.

Although it will be apparent that the regulator might be arranged to provide an on-off signal to the motor 36 to provide solid material to the molten body 12 when the level thereof drops below a predetermined height and to cut off the supply of solid material when the height is exceeded, it is preferable that a fully modulated arrangement be provided wherein the rate of feed of the marbles is adjusted for the height of the molten body at each instant.

The heating current for the feeder or bushing 10 is alternating current supplied over a main power supply line by way of conductors 60 and 62. The power source, for example, may be a 440 volt, 60 cycle source, not shown.

The alternating current is supplied to the feeder 10 through a step-down transformer 64 which typically reduces the voltage, for example, to a value in the order of 2 volts, which, since the feeder 10 is made of low resistance high temperature metal such as platinum, is capable of providing heating current in the order of one or more kiloamperes. The primary loop of the power circuit for the feeder 10 contains a power circuit 66 specifically shown and described with reference to FIG. 2, which controls the current flow through the feeder or bushing 10 thereby controlling the temperature thereof.

The conductor 60 is connected to one side of the primary winding of the step-down transformer 64; while the other conductor 62 is connected to the power circuit 66. Another conductor 63 is connected between the other side of the primary winding of the transformer 64 and the power circuit 66. These power connections are more specifically illustrated in FIG. 2.

The power circuit 66 is electrically associated with a thermocouple assembly typically including a pair of thermocouples 68 and 70 which are disposed within the side of the feeder or bushing 10 to sense the temperature of the molten material therein. The thermocouples 68 and 70 generate electrical signals corresponding to the temperature of the feeder 10.

The thermocouples 68 and 70 are connected to a temperature averaging circuit 72 which effectively averages the current signals generated to produce a single averaged signal which corresponds to the average temperature sensed by the thermocouples in the feeder 10. The output of the temperature averaging circuit is fed to a comparator circuit 74.

The comparator circuit 74 is also coupled to an adjustable reference signal source 76 which supplies a reference signal proportional to the temperature desired in the feeder 10. If a deviation or difference occurs between the signal from the thermocouples and the reference signal, a so-called "error" signal is produced by the comparator circuit 74.

The output of the comparator circuit 74 is fed to an amplifier circuit 78 which amplifies the error signal from the comparator circuit. The output of the amplifier circuit 78 is then fed to the power circuit 66 which in turn monitors the current flow to the feeder 10, through the transformer 64 from the power supply lines 60 and 62.

It will be appreciated that in certain applications of the system, the output of the power circuit may provide a feedback signal through suitable conductors 108 and 110 to the input of the amplifier 78 to effect voltage stability of the system.

Very briefly, in the operation of the system, the temperature of the feeder or bushing 10 is measured or sensed by the thermocouples and the averaged output signal therefrom is compared to a reference signal from the signal source 76. If a deviation between the measured value and the reference value exists, the power circuit 66 is commanded to readjust the current flow to the transformer 64, thus maintaining the temperature of the feeder at the desired point.

FIGURE 2 illustrates the power circuit 66 in clear and concise detail. The input to the circuit appears as a D.C. potential across conductors 80 and 82 and is fed to the control winding of a magnetic amplifier stage 84.

The bias winding of the magnetic amplifier 84 is coupled to a secondary winding of a 60 cycle control transformer 85. The bias winding of the magnetic amplifier 84 is effective to saturate the magnetic core material of the device to produce the desired threshold bias.

The output winding of the magnetic amplifier is coupled to another secondary winding of the control transformer 85 and the primary winding of a step-down transformer 86.

Zener diodes may be employed in the magnetic amplifier circuit to appropriately clip the signals to provide a desired wave form. The signal amplified by the magnetic amplifier 84 is fed to the primary winding 86a of the transformer 86. The transformer 86 has a pair of secondary windings 86b and 86c which are connected to a silicon controlled rectifier assembly 88. The silicon controlled rectifier assembly 88 includes semiconductor elements 90, 91, 92, and 93 arranged in two pairs to provide for operation on both halves of the cycles of the alternating power source and to permit their usage at high voltage levels.

It has been found that satisfactory results may be achieved by employing silicon controlled rectifiers, for example, of the type commercially available under the commercial designation of Type C60 (General Electric Company). Each of the rectifiers, as shown in FIG. 2, is a three junction semiconductor device and has a reverse characteristic which is similar to a normal silicon rectifier in that it represents essentially an open circuit with negative anode to cathode voltage below a critical break-over voltage if no signal is applied to the gate terminal. However, in the present circuit arrangement, when the forward break-over voltage is exceeded, for example, by applying an appropriate gate signal, the device will rapidly change to a conducting state and present a low forward voltage drop.

One of the pairs of elements 90 and 91 is coupled to secondary winding 86b; while the other pair 92 and 93 is coupled to secondary winding 86c.

Additionally, the silicon controlled rectifier assembly includes a voltage divider network consisting of resistor elements $R_1$, $R_2$, $R_3$ and $R_4$. The resistance value of these resistors is less than the forward leakage resistance of their respective silicon rectifier 90, 91, 92 and 93. Therefore, the potential distribution across the assembly 88 is controlled by the resistors $R_1$, $R_2$, $R_3$, and $R_4$ rather than by the leakage resistance of silicon rectifiers.

The rectifiers assembly 88 also includes capacitor elements $C_1$, $C_2$, $C_3$, and $C_4$ associated with the silicon controlled rectifier elements. The capacitors typically act to suppress the transients produced upon the triggering or firing of the silicon controlled rectifier elements 90, 91, 92 and 93. The capacitor elements $C_1$ and $C_3$ are also and more specifically employed to couple the firing pulse of the silicon controlled rectifiers 90 and 92 to the elements 91 and 93, respectively, in addition to functioning as transient suppressors.

In operation, the D.C. signal sensed across conductors 80 and 82 is proportional to the deviation of the temperature of the feeder from the desired level and is effective to vary the impedance of the magnetic amplifier 84. Manifestly, the impedance of the magnetic amplifier determines the potential appearing across the primary winding 86a of the transformer 86. As the D.C. signal across the conductors 80 and 82 increases, the impedance of the magnetic amplifier 84 decreases and the output thereof appearing across the primary winding 86a increases in its difference in phase and magnitude from the load voltage in proportion to the deviation of temperature at the feeder 10 from the desired level.

The silicon controlled rectifier assembly is caused to conduct when an output from the magnetic amplifier 84 appears across the primary winding of the transformer 86. Upon conduction, the silicon controlled rectifier assembly commands current to be fed to the feeder 10. It will be appreciated that the silicon controlled rectifier elements 90 and 91 are effective to handle one-half of the cycle of the alternating current, while the elements 92 and 93 handle the opposite or other half-cycle of the operation. Since both portions of the circuit operate similarly, the operation of only one will be described. Assuming an error signal has been produced and is sensed across the conductors 80 and 82, the signal amplified by the magnetic amplifier 84 is sensed as an alternating potential across the silicon controlled rectifier elements 90 and 91 and is effective to produce a voltage drop across resistor $R_1$ sufficient to fire the element 90, whereupon it conducts current and the voltage drops very rapidly to almost zero. Capacitor $C_1$ then rapidly discharges, causing current to flow through the coupling resistor $R_5$ which, together with the voltage sensed across resistor $R_2$, will cause the firing of the element 91. The system will now conduct only that portion of one polarity of the alternating current as commanded by the remainder of the circuit. The other portion of the cycle is handled by the silicon controlled rectifiers 92 and 93 and their associated circuitry ($C_3$, $C_4$, $R_3$, $R_4$, and $R_5$) in the same manner as described above.

Manifestly, when sufficiently current has passed through the feeder 10 to bring the material therein to the desired temperature, the silicon controlled rectifier assembly 88 will cease conducting and stop the transmission of energy to feeder 10 through the transformer 64.

Feedback from the power circuit 66 is achieved by taking a portion of the output signal voltage sensed across conductors 100 and 102, through a step-down transformer 104, a full-wave rectifier 106, and the first stage of the amplifier 78 through suitable conductors 108 and 110.

It will be appreciated that in the typical overall operation of the control system, the temperature of the feeder 10 may initially be raised to a level typically in the order of 1700° F., whereupon the automatic control system takes over. If desired, however, controls can be provided extending from zero on up to operating temperature. The reference signal source 76 is adjusted to the desired temperature setting, for example, 2300° F. Since temperature of the feeder 10 is below the desired level, the comparator circuit 74 will sense the difference and will produce an "error" signal which is amplified and fed to the power circuit 66. The phase of the signal being thus fed to the power circuit is effective to cause the silicon controlled rectifier assembly to conduct allowing current to flow to the feeder 10 from the power supply through the power conductors 60 and 62. When the temperature reaches the desired level, the comparator circuit 74 will no longer sense a difference between the measured value and the reference value and will de-energize the silicon controlled rectifier assembly 88 thus stopping any further current flow to feeder 10. The system will remain in the quiescent state until a deviation is again sensed between the measured value and the reference value due to a decrease in the temperature of the feeder 10.

Although reference has been made in the description to silicon controlled rectifiers, the invention includes within its scope the use of other solid state rectifier elements.

The control system of the invention provides an efficient means for monitoring the temperature of the feeder of a glass melting and feeding furnace which is extremely light in weight, small in overall external dimensions, and exceedingly accurate.

In view of the foregoing, it will be understood that while I have shown a certain particular form of my invention, I do not wish to be limited thereto since many modifications may be made within the concept of the invention and I, therefore, contemplate by the appended claims to cover all modifications which fall within the spirit and scope of my invention.

I claim:

1. The combination with an electrically heated fiber forming feeder for molten glass for producing glass fibers of a temperature control circuit for maintaining a predetermined substantially constant temperature within said feeder, said temperature control circuit comprising means for sensing the temperature of said device and generating a control signal proportional to any deviation from said predetermined temperature, a magnetic amplifier, means coupling said control signal to said magnetic amplifier, a control transformer, means coupling said control transformer to said magnetic amplifier, a step-down transformer, means coupling said magnetic amplifier to said step-down transformer and said control transformer, a silicon controlled rectifier assembly, means coupling said silicon controlled rectifier assembly to said step-down transformer, a source of alternating current, means coupling said alternating current source to said silicon controlled rectifier assembly and to said control transformer, and means for connecting said silicon controlled rectifier assembly to said heated fiber forming feeder, whereby the amount of power fed to said heated fiber forming feeder is regulated by the silicon controlled rectifier assembly in accordance with the control signal generated.

2. The combination with an electrically heated fiber forming feeder for molten glass for producing glass fibers of a temperature control circuit for maintaining a predetermined substantially constant temperature within said feeder, said temperature control circuit comprising means for sensing the temperature of said feeder and generating a control signal proportional to any deviation from said predetermined temperature, a magnetic amplifier having control, bias and output windings, means coupling said control signal to the control winding of said magnetic amplifier, a control transformer having a primary winding and first and second secondary windings, means coupling said bias winding of said magnetic amplifier to said first secondary winding of said control transformer, a step-down transformer having a primary winding and first and second secondary windings, means coupling said output winding of said magnetic amplifier to said second secondary winding of said control transformer and said primary winding of said step-down transformer, a silicon controlled rectifier assembly including first and second pairs of silicon controlled rectifiers and a voltage divider network, means coupling said first secondary winding of said step-down transformer to said first pair of silicon controlled rectifiers, means coupling said second secondary winding of said step-down transformer to said second pair of silicon controlled rectifiers, a source of alternating current, means coupling said alternating current source to said silicon controlled rectifier assembly and to said primary winding of said control transformer, and means for connecting said silicon controlled rectifier assembly to said heated fiber forming feeder, whereby the amount of power fed to said heated fiber forming feeder is regulated by the silicon controlled rectifier assembly in accordance with the control signal generated.

3. The combination according to claim 2 including a capacitor connected across each of said silicon controlled rectifiers in each of said pairs of rectifiers to suppress transients and to facilitate firing of said rectifiers.

4. The combination according to claim 2 including a feedback circuit from the output of said silicon controlled rectifier assembly to said means for sensing and generating.

References Cited by the Examiner
UNITED STATES PATENTS

| | | | |
|---|---|---|---|
| 2,987,666 | 6/1961 | Manteuffel | 323—58 |
| 3,047,647 | 7/1962 | Harkins et al. | 13—6 |
| 3,050,611 | 8/1962 | Kamide | 219—20.41 |
| 3,051,813 | 8/1962 | Busch et al. | 219—10.41 |
| 3,062,942 | 11/1962 | Finlay et al. | 219—10.41 |
| 3,097,314 | 7/1963 | Harriman | 219—20.41 |
| 3,109,910 | 11/1963 | Fogleman | 219—20.41 |

LLOYD McCOLLUM, *Primary Examiner.*

JOSEPH V. TRUHE, MAX L. LEVY, *Examiners.*